UNITED STATES PATENT OFFICE.

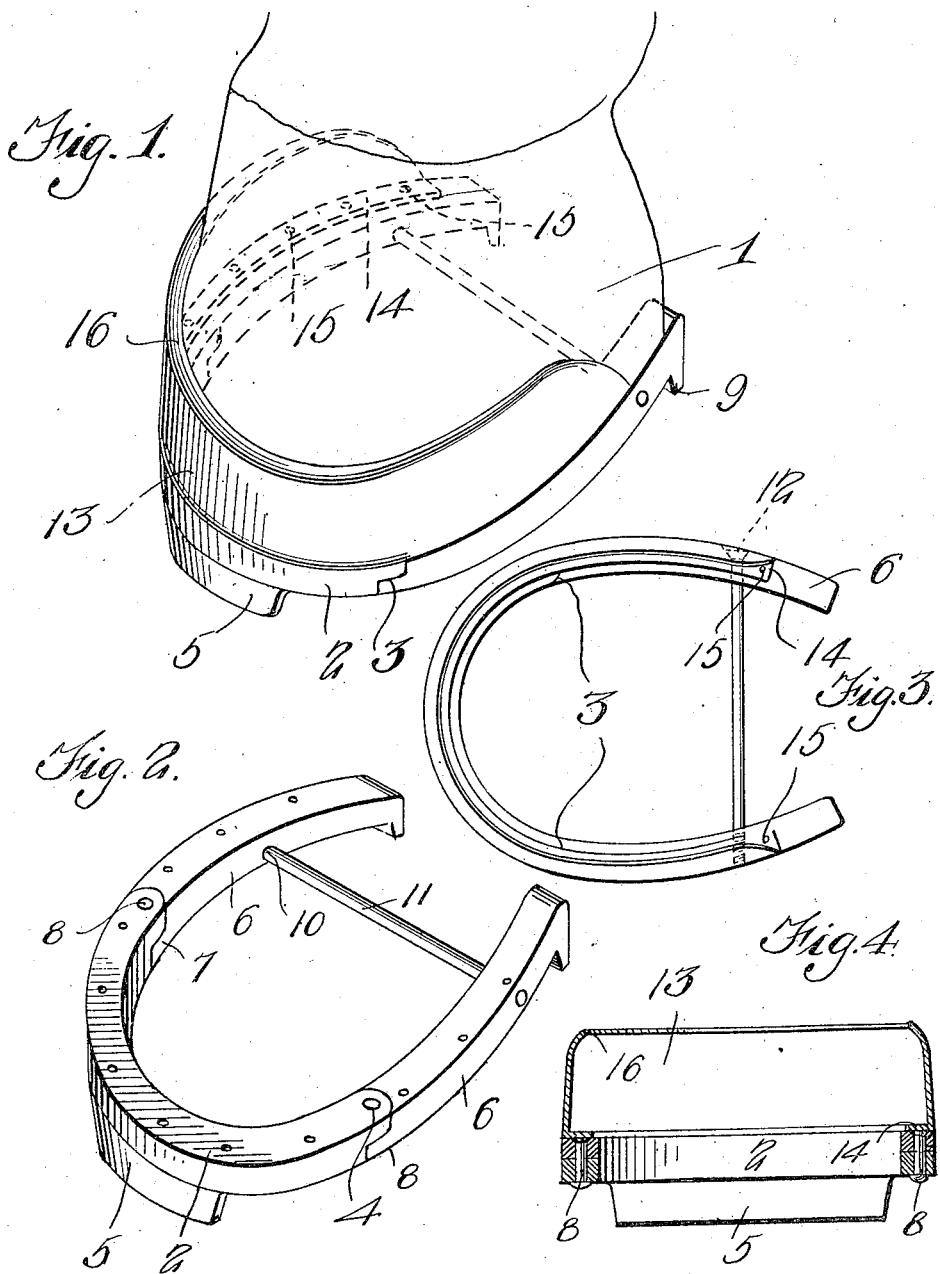

HENRY BORCHERTS, OF DAHLGREN, ILLINOIS.

NAILLESS HORSESHOE.

1,262,627.

Specification of Letters Patent.   Patented Apr. 16, 1918.

Application filed May 18, 1917. Serial No. 169,490.

*To all whom it may concern:*

Be it known that I, HENRY BORCHERTS, a citizen of the United States, residing at Dahlgren, in the county of Hamilton and State of Illinois, have invented certain new and useful Improvements in Nailless Horseshoes; and I do hereby declare the following to be a full, clear, and exact description of the invention, such as will enable others skilled in the art to which it appertains to make and use the same.

This invention relates to improvements in nailless horseshoes.

The object of the invention is to provide a horseshoe or the like capable of being readily secured to a horse's hoof without the use of nails or the like.

Another object of this invention is to provide a horseshoe equipped with novel means, whereby the shoe may be readily and easily applied to the horse's hoof without the use of nails being driven into the hoof, thereby eliminating injury to the foot of the horse.

A further object of this invention is to provide a horseshoe of this character, which comprises a toe section having a calk intermediate its ends, a pair of heel sections pivotally secured to the ends of the toe section, and means extending through the heel sections for adjustably and rigidly securing the sections together and upon the hoof of the horse.

A still further object of this invention is to provide a nailless horseshoe comprising a toe section and a pair of heel sections pivotally secured to the ends of the toe section, calks formed on the toe and heel sections, and a flexible shield formed of resilient sheet-metal secured to the upper side of the toe and heel sections and having its upper peripheral edge bent in a substantially horizontal plane to be embedded in the hoof of the horse assisting in holding the sections to the hoof of the horse, and means extending transversely through the heel sections detachably clamping the shoe to the hoof of the horse.

A still further object of this invention is the provision of a horseshoe of this character, which will be simple, practical and comparatively inexpensive in construction and one that can be manufactured and sold at a low cost.

With these and other objects in view, the invention consists in the novel combination and arrangement of parts hereinafter more fully described and set forth in the claim hereto appended.

In the drawing:

Figure 1 is a perspective view illustrating the shoe as applied to the horse's hoof.

Fig. 2 is a perspective view of the shoe with the shield omitted.

Fig. 3 is a top plan view of the complete shoe.

Fig. 4 is a transverse sectional view.

Like numerals of references designate corresponding parts in all the figures of the drawings.

Referring to the drawing, the numeral 1 designates the hoof of a horse of the usual configuration, and to which my improved shoe is adapted to be applied.

The horseshoe comprises in its construction, an arcuate toe section 2, which has its ends reduced as at 3 and provided with a vertical opening 4. A toe calk 5 is formed on and depends from the under side of the toe section 2 centrally thereof and is curved to conform to the configuration of the arcuate member 2. A pair of heel sections 6 have one of their ends reduced as at 7 and the reduced portions 7 are provided with openings alining with the openings 4 in the reduced portions of the toe section 2.

The heel sections 6 are pivotally secured to the reduced ends of the toe section 2 by suitable vertical pins 8, which are arranged through the openings in each of the reduced portions of the toe and heel sections.

The free ends of the heel sections are bent downwardly to provide the heel calks 9 as in the usual construction of horseshoes.

The heel sections 6 are each provided adjacent their rear ends with a transverse opening 10, which openings are screw-threaded to receive the transverse locking bar 11, which has its headed end 12 countersunk in one of the sections 6 as shown in Fig. 3, and the opposite end of the locking bar 11 is screw-threaded to removably fit the threads in the other section 6 to adjustably connect the sections together and to the hoof of the animal.

A shield member 13 constructed of suitable flexible sheet material, such as steel or the like, is substantially semi-circular and has its lower peripheral edge bent inwardly at right angles thereto to provide the attaching flange 14, which is rigidly secured to the upper side of the toe section 2 and heel sections 6 by suitable rivets or the like designated 15. The shield member 13 tapers from its medial portion toward its opposite ends and has its upper peripheral edge bent inwardly at right angles and provides a substantially horizontal gripping flange 16, which when applied to the hoof of the horse, it may be struck by a suitable instrument and forced into the hoof, thus retaining the shoe in position thereon.

It is to be understood that the rivets 15 rigidly secure the shield member 13 to the upper side of the sections and due to its flexibility, it may be slightly swung apart fitting the shoe to the hoof of the horse or animal. When it is desired to clamp the shoe to the hoof of an animal, the locking bolt 11 is removed from the sections 6 and the same are forced inwardly from the forward part of the hoof toward the rear and the horse's hoof rests upon the attaching flange 14 and the upper sides of the sections 2 and 6; and the horizontal flange 16 of the shield 13 is given a slight blow with a suitable instrument, driving it into a portion of the horse's hoof. The locking member 11 is then arranged through or fitted in the openings 10 in the sections 6 and adjusted therein, thus drawing the sections toward one another and clamping the shoe to the hoof of the horse or animal.

What is claimed is:

A nailless horseshoe comprising an arcuate toe section having its ends reduced, a pair of curved heel sections having one of their ends reduced and pivotally secured to the reduced ends of the toe section, each free end of said heel sections provided with a transverse screw-threaded opening, a locking member removably fitted in the screw-threaded openings of the heel sections to removably and adjustably clamp the shoe to the hoof of an animal, and a flexible shield member substantially semicircular having its lower longitudinal edge bent horizontally to provide an attaching flange which is adapted to be rigidly secured to the upper side of the heel and toe sections and its flexibility permitting of relative movement of the heel sections and the shield with relation to the toe section, the upper longitudinal edge of the shield being bent at right angles to permit it to be embedded in the hoof of the animal to retain the same when the sections are fitted against the hoof of the animal.

In testimony whereof I affix my signature in presence of two witnesses.

HENRY BORCHERTS.

Witnesses:
SAMUEL M. MAULDING,
FRED H. BRINE.

Copies of this patent may be obtained for five cents each, by addressing the "Commissioner of Patents, Washington, D. C."